(12) United States Patent
Hershey et al.

(10) Patent No.: US 7,414,982 B2
(45) Date of Patent: Aug. 19, 2008

(54) DISTRIBUTED DYNAMIC CHANNEL SELECTION IN A COMMUNICATION NETWORK

(75) Inventors: Stephen P. Hershey, Falls Church, VA (US); William W. Su, Falls Church, VA (US)

(73) Assignee: Raytheon Company, Waltham, MA (US)

( * ) Notice: Subject to any disclaimer, the term of this patent is extended or adjusted under 35 U.S.C. 154(b) by 1036 days.

(21) Appl. No.: 10/603,240

(22) Filed: Jun. 24, 2003

(65) Prior Publication Data

US 2008/0144524 A1     Jun. 19, 2008

(51) Int. Cl.
*H04J 1/16*     (2006.01)
(52) U.S. Cl. .............. 370/252; 370/278; 370/329
(58) Field of Classification Search ............ 370/401, 370/236, 238, 432, 430, 235, 338, 278, 252, 370/329, 328; 709/223, 238, 206; 455/41.2, 455/412.1, 41.3
See application file for complete search history.

(56) References Cited

U.S. PATENT DOCUMENTS

| | | | |
|---|---|---|---|
| 6,990,316 B2 * | 1/2006 | Heinonen et al. | ........... 455/41.2 |
| 7,020,438 B2 * | 3/2006 | Sinivaara et al. | ........... 455/41.2 |
| 2003/0002456 A1 | 1/2003 | Soomro et al. | ............... 370/328 |

FOREIGN PATENT DOCUMENTS

| WO | WO 03/021886 A2 | 3/2003 |
|---|---|---|
| WO | WO 03/024129 A1 | 3/2003 |

OTHER PUBLICATIONS

PCT Notification Transmittal of the International Search Report and the Written Opinion of the International Searching Authority, or the Declaration mailed Dec. 10, 2004, re PCT/US2004/018052 filed Jun. 3, 2004 (17 pages).
Black, et al., *Dynamic Frequency Selection (DFS) in an Independent BSS (IBSS)*, IEEE 802.11-01/532r0 (9 pages), Nov. 1, 2001.
IEEE: Draft supplement to IEEE 802.11h Standard D3.3: *Spectrum and Transmit Power Management Extensions in the 5GHz Band in Europe* (89 pages), Feb. 2003.

* cited by examiner

*Primary Examiner*—John Pezzlo
(74) *Attorney, Agent, or Firm*—Baker Botts L.L.P.

(57) ABSTRACT

In one embodiment, a first node among a number of distributed nodes capable of forming or reforming a communication network between the nodes, each of the nodes including functionally similar components for forming or reforming such a network, includes a memory for storing values for variables for the node. The first node also includes one or more components collectively operable to: (1) spontaneously and independent of a centralized controller associated with the network, transmit a probe message to one or more of the other nodes for purposes of forming or reforming a network; (2) receive a probe message from a second node, the probe message including values for the variables for the second node; (3) compare the values for the variables for the first node to the values for the variables for the second node within the probe message to determine, independent of a centralized controller associated with the network, whether the first node should set itself to a new channel; and (4) if so, set the first node to the new channel.

68 Claims, 11 Drawing Sheets

FIG. 4

| PROBING NODE | RECEIVING NODE |
|---|---|
| HOMED | HOMED |
| HOMED | VISITING WITH HOME CHANNEL |
| HOMED | VISITING WITHOUT HOME CHANNEL |
| VISITING WITH HOME CHANNEL | HOMED |
| VISITING WITHOUT HOME CHANNEL | HOMED |
| VISITING WITH HOME CHANNEL | VISITING WITH HOME CHANNEL |
| VISITING WITH HOME CHANNEL | VISITING WITHOUT HOME CHANNEL |
| VISITING WITHOUT HOME CHANNEL | VISITING WITH HOME CHANNEL |
| VISITING WITHOUT HOME CHANNEL | VISITING WITHOUT HOME CHANNEL |

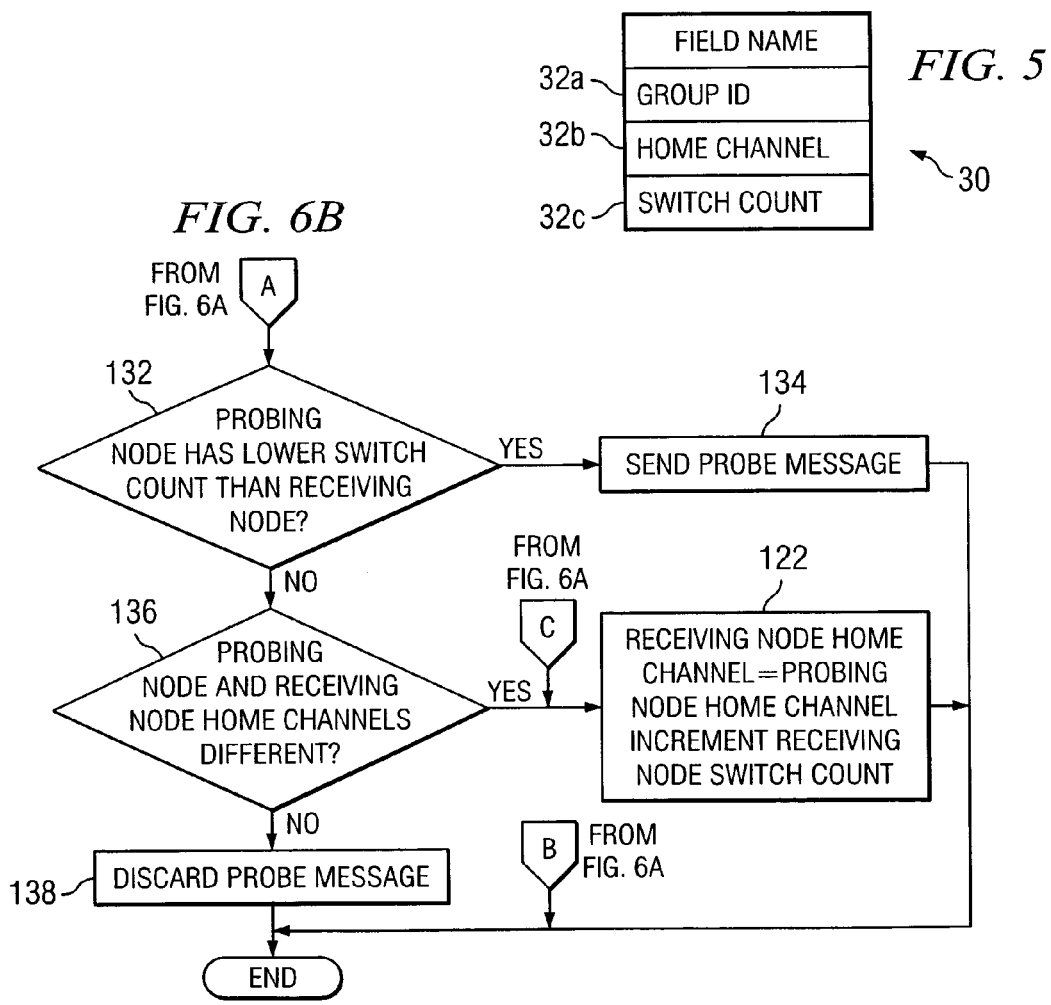

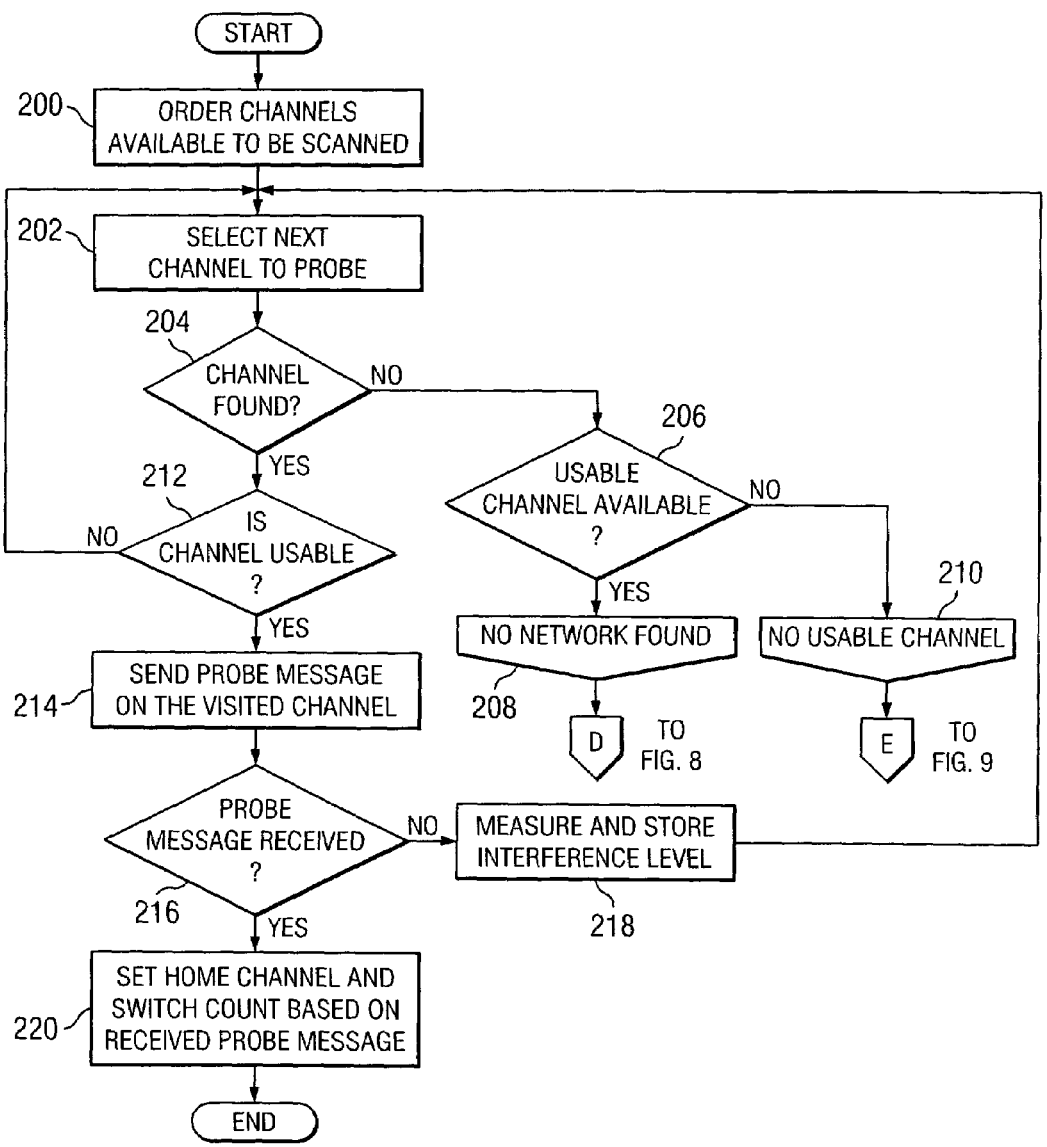

FIG. 11A
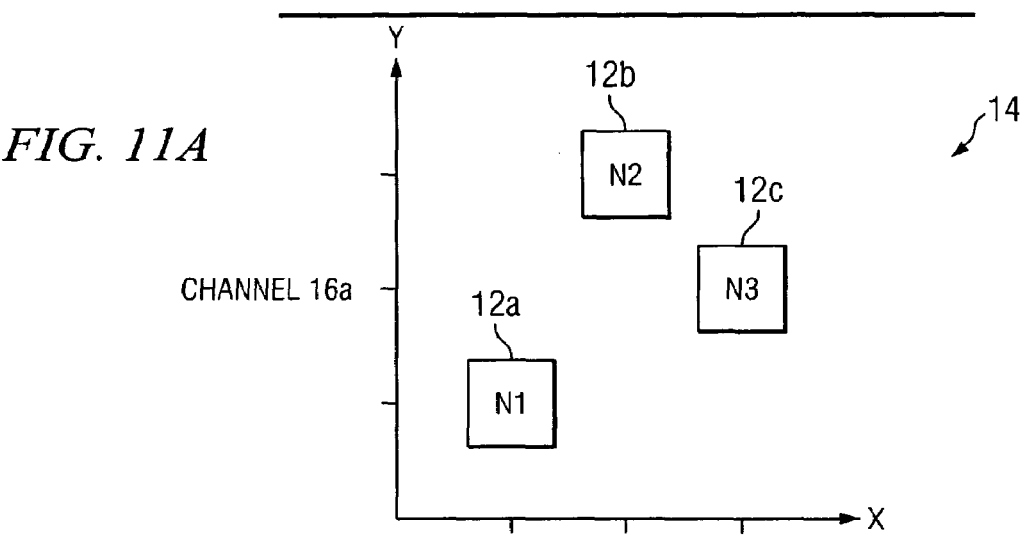
CHANNEL 16a
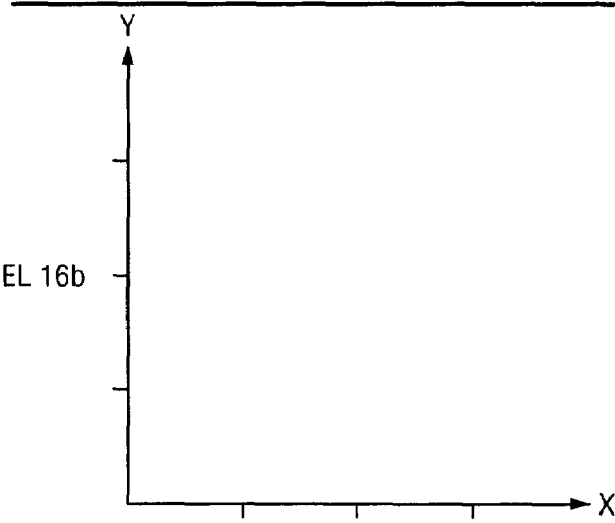
CHANNEL 16b
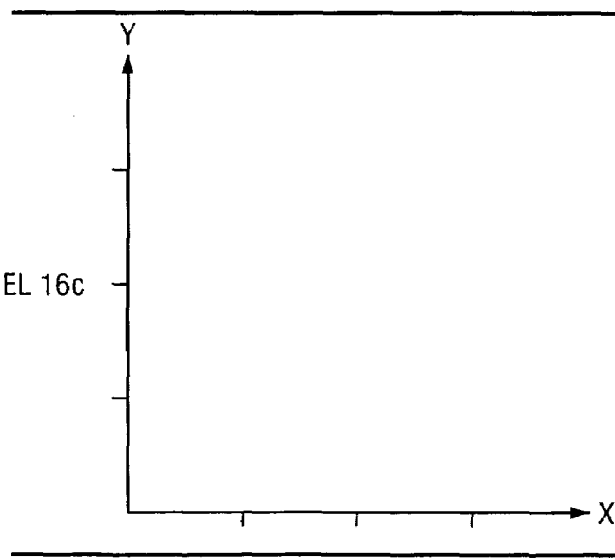
CHANNEL 16c

FIG. 11B

| DDCS | HOME CHANNEL | GROUP ID | SWITCH COUNT |
|---|---|---|---|
| NODE 12a | 16a | 22 | 2 |
| NODE 12b | 16a | 22 | 2 |
| NODE 12c | 16a | 22 | 2 |

FIG. 11E

| DDCS | HOME CHANNEL | GROUP ID | SWITCH COUNT |
|---|---|---|---|
| NODE 12a | 16a | 22 | 2 |
| NODE 12b | 16b | 22 | 3 |
| NODE 12c | 16c | 22 | 3 |

FIG. 11G

| DDCS | HOME CHANNEL | GROUP ID | SWITCH COUNT |
|---|---|---|---|
| NODE 12a | 16a | 22 | 2 |
| NODE 12b | 16c | 22 | 3 |
| NODE 12c | 16c | 22 | 3 |

FIG. 11I

| DDCS | HOME CHANNEL | GROUP ID | SWITCH COUNT |
|---|---|---|---|
| NODE 12a | 16c | 22 | 3 |
| NODE 12b | 16c | 22 | 3 |
| NODE 12c | 16c | 22 | 3 |

DISTRIBUTED DYNAMIC CHANNEL SELECTION IN A COMMUNICATION NETWORK

GOVERNMENT FUNDING

The U.S. Government may have certain rights in this invention as provided for by the terms of Grant No. F30602-02-C-0191 awarded by the Defense Advanced Research Projects Agency (DARPA).

TECHNICAL FIELD OF THE INVENTION

This invention relates generally to the field of communications and more particularly to distributed dynamic channel selection in a communication network.

BACKGROUND

Dynamic channel selection (DCS) generally allows nodes within a node group to automatically, without pre-existing knowledge of the channel initially occupied by each node in the node group, select a channel on which to initially form a network or select a new channel on which to reform the network when desirable (e.g., when the current channel becomes unusable). Certain implementations of DCS include a central controller within a DCS network that decides the channels on which nodes within a node group should initially form a network. Additionally, the central controller may decide when the network should transition to a new channel and then manage the channel transitions of other nodes. For example, the IEEE 802.11h working group is producing a specification that adds DCS capabilities to the IEEE 802.11a specification. As another example, the ETSI Broadband Radio Access Networks (BRAN) HIPERLAN/2 specification also includes DCS capabilities. Both of these approaches utilize a node within the network that is given special authority for deciding when the network should select a new channel based on the operating conditions on the current channel.

SUMMARY OF THE INVENTION

According to the present invention, certain disadvantages and problems associated with previous dynamic channel selection techniques may be reduced or eliminated.

In one embodiment, a first node among a number of distributed nodes capable of forming or reforming a communication network between the nodes, each of the nodes including functionally similar components for forming or reforming such a network, includes a memory for storing values for variables for the node. The first node also includes one or more components collectively operable to: (1) spontaneously and independent of a centralized controller associated with the network, transmit a probe message to one or more of the other nodes for purposes of forming or reforming a network; (2) receive a probe message from a second node, the probe message including values for the variables for the second node; (3) compare the values for the variables for the first node to the values for the variables for the second node within the probe message to determine, independent of a centralized controller associated with the network, whether the first node should set itself to a new channel; and (4) if so, set the first node to the new channel.

In certain embodiments, the present invention may allow nodes within a node group to automatically, without pre-existing knowledge of the channel initially occupied by each node and without the use of a centralized controller (e.g., a centralized controller node), select a new channel on which to reform the network when required or desirable (e.g., the current channel becomes unusable). This ability may allow nodes in a network to form or reform a network in a more agile manner than other solutions that use a centralized controller to form or reform a network. In one embodiment, the present invention may apply a distributed approach to DCS such that there is no central controller (e.g., a central controller node) that decides when a network should transition to a new channel and then manages the channel transitions of other nodes. Instead, each node within a network may individually decide when to change channels based on its local sensing of channel condition control message exchanges with other nodes, and any other suitable information. Each node, after changing channels, may attract its peer nodes on its previous channel to its new channel. The network may completely reform on the new channel. In certain embodiments, these operations may be referred to as distributed dynamic channel selection (DDCS).

Certain embodiments of the present invention may provide some, all, or none of the above technical advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present invention and features and advantages thereof, reference is now made to the following description, taken in conjunction with the accompanying drawings, in which:

FIG. 4 illustrates example states of DDCS probing nodes and receiving nodes;

FIG. 5 illustrates an example format of a probe message that may be sent by a DDCS node;

FIGS. 6A-6B illustrates an example method for processing a probe message at a DDCS node;

FIG. 7 illustrates an example method for performing a home channel selection procedure;

FIGS. 11A through 11I illustrate an example scenario in which the DDCS protocol is used to reform a network among a node group.

DESCRIPTION OF EXAMPLE EMBODIMENTS

Figure 1:
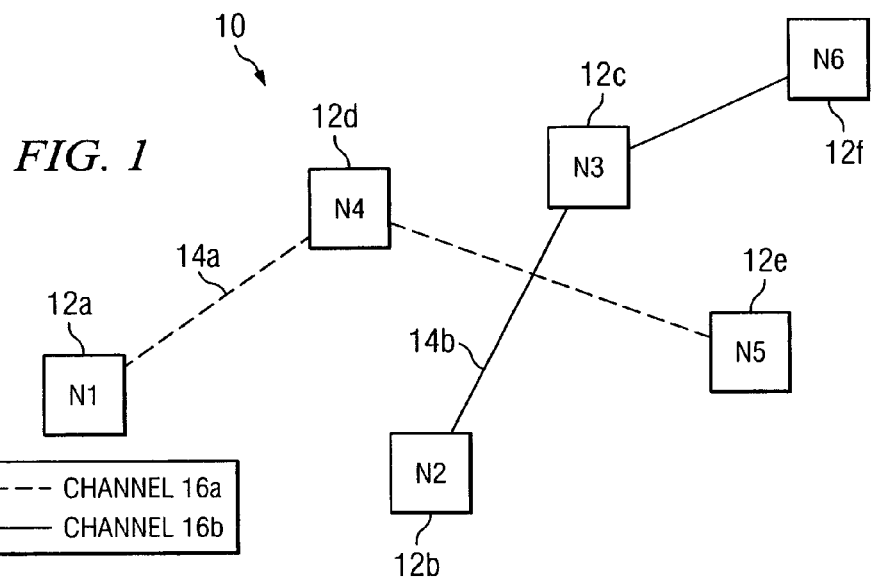
FIG. 1 illustrates an example distributed dynamic channel selection (DDCS) node group of DDCS nodes that is divided into two separate networks, one network shown in dashed lines and one network shown in solid lines.

FIG. 1 illustrates an example distributed dynamic channel selection (DDCS) node group 10 of DDCS nodes 12 that is divided into two separate networks 14a (shown in dashed lines) and 14b (shown in solid lines). In one embodiment, a node 12 includes a channel-agile mobile terminal within a wireless ad-hoc network. A node group 10 may include a set of nodes 12 that need to or that a user desires to communicate.

A network 14 may include a set of nodes 12 within a node group 10 that are able to exchange data-plane messages via one or more link-level hops over a single, shared channel 16. In one embodiment, networks 14 include wireless ad-hoc networks, although the present invention contemplates networks 14 including any suitable types of networks such as one or more local area networks (LANs), metropolitan area networks (MANs), wide area networks (WANs), a global computer network such as the Internet, or any other wireline, optical, wireless, or other links. Networks 14 may include military networks, commercial networks, a combination of military and commercial networks, or any other suitable networks. In one embodiment, certain nodes 12 may have direct link-level connectivity with one another while other nodes 12 may not. For example, node 12*a* and node 12*d* have direct link-level connectivity with each other while node 12*a* and node 12*e* are able to exchange network-level messages indirectly by routing the messages via node 12*d*. Similar relationships exist for nodes 12*b*, 12*c*, and 12*f*. In the illustrated embodiment, network 14*a* is located on a first channel 16*a*, and network 14*b* is located on a second channel 16*b* such that a node 12 on channel 16*a* may not exchange a data-plane message with a node 12 on channel 16*b* by either direct or indirect means due to the differing channel occupancy.

Figure 2:
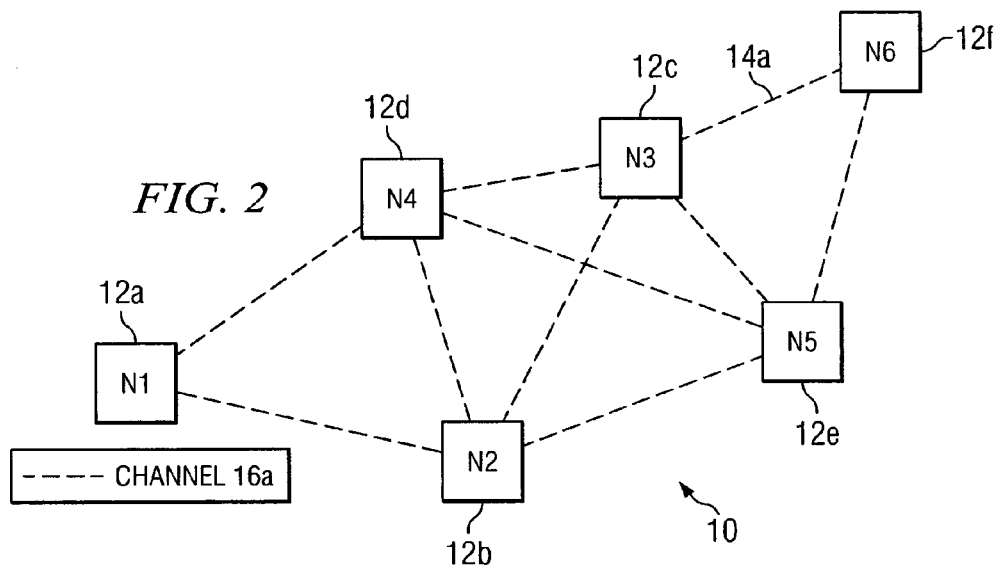
FIG. 2 illustrates DDCS node group after having consolidated on a single channel.

Dynamic channel selection (DCS) generally allows nodes 12 within a node group 10 to automatically, without pre-existing knowledge of the channel 16 initially occupied by each node 12, select a new channel 16 on which to reform the network 14 when required or desirable (e.g., the current channel 16 becomes unusable). In general, DDCS applies a distributed approach to DCS such that there is no central controller (e.g., a central controller node) that decides when a network 14 should transition to a new channel 16 and then manages the channel transitions of other nodes 12. Instead, each DDCS node 12 within a network 14 individually decides when to change channels 16 based on its local sensing of channel conditions, DDCS control message exchanges with other nodes 12, and any other suitable information. Each node 12, after changing channels 16, may attract its peer nodes 12 on its previous channel 16 to its new channel 16. For example, FIG. 2 illustrates DDCS node group 10 after having consolidated on a single channel 16*a*. Nodes 12 within node group 10 have maximum connectivity such that any node 12 can directly or indirectly exchange a data plane message with any other node 12 within node group 10. In one embodiment, the DDCS protocol automatically consolidates multiple independent DDCS networks 14 onto a single channel 16.

A DDCS node 12 may periodically probe, listen to, or otherwise use available channels 16 to determine whether it should change channels 16. With respect to probing, a probing node 12 is a node 12 that is transmitting a probe message, and a receiving node 12 is a node 12 that is receiving a probe message. A primary user is a user with super-ordinate right to use a particular channel 16, and a secondary user is a user with subordinate right to the use of a channel 16. In one embodiment, when a primary user begins operation on a channel 16, secondary users within range must vacate the channel 16. In one embodiment, DDCS may be implemented as a protocol that may be integrated into existing and new protocol stacks to enable DDCS.

Figure 3:
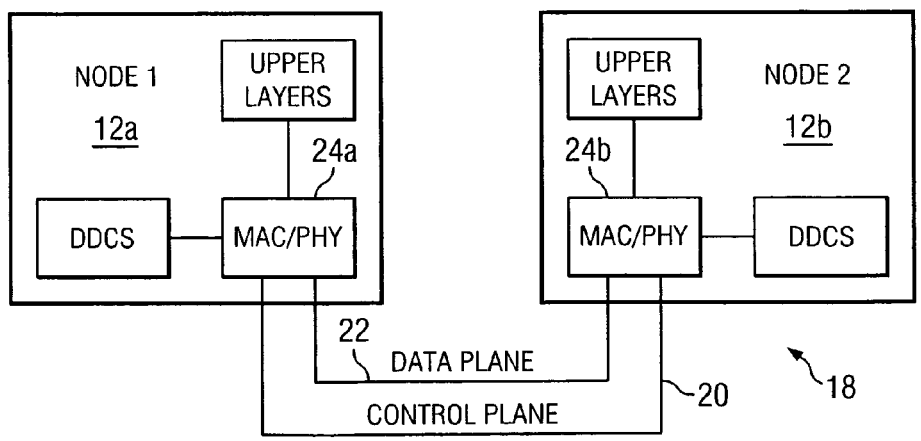
FIG. 3 illustrates an example logical view of how DDCS may be integrated into two nodes.

FIG. 3 illustrates an example logical view 18 of how DDCS may be integrated into two nodes 12*a* and 12*b*. Nodes 12*a* and 12*b* may exchange DDCS control messages over a control plane 20 joining nodes 12*a* and 12*b*. In one embodiment, the DDCS control messages may share control plane 20 with other medium access control (MAC) messages or other control messages that support a data plane 22. DDCS may be integrated into any suitable MAC layer and/or physical layer (PHY) protocol 24 in any suitable manner, according to particular needs.

Each DDCS node 12 may maintain one or more DDCS node variables. In one embodiment, the primary node variables include a group ID variable, a home channel variable, and a switch count variable. Although these three node variables are primarily described, a node 12 may maintain any suitable number and types of node variables according to particular needs. The group ID variable indicates the node group membership of a node 12. In one embodiment, a user configures the group ID variable. The home channel variable indicates the home channel 16 of a node 12, which is the channel 16 on which a node 12 currently has data-plane connectivity with other nodes 12 within the node group 10 of the node 12. A visited channel 16 is a channel 16 on which a node 12 has temporary control-plane connectivity for the purpose of sending or receiving DDCS control messages such as a probe message. The switch count variable reflects the number of times that a node 12 has changed channels 16, which may influence the home channel switching behavior of a node 12. In one embodiment, when a node 12*a* receives a control message from another node 12*b* from the same node group 10, node 12*a* may compare its own switch count value to the switch count value of node 12*b* when node 12*a* is deciding whether to change its current home channel 16 to the home channel 16 of node 12*b*. A node 12 may maintain additional node variables, which may also be compared when deciding whether to change the current home channel 16.

Despite the absence of a central controller, in one embodiment a DDCS network 14 completely vacating its current channel 16 may completely reform on another channel 16, given sufficient time and assuming that the new channel 16 is usable by all nodes 12 within the node group 10. In one embodiment, temporary fragmentation of a node group 10 across multiple home channels 16 may occur due to the time required for each node 12 of the node group 10 to independently discover the new home channel 16. In one embodiment, the DDCS protocol supports optional procedures that can reduce network 14 formation and reformation time. Certain of these optional procedures are described below.

In one embodiment, the DDCS protocol may be deployed in both ad-hoc and infrastructure networks 14. DDCS may be deployed using a probing strategy, a listening strategy, a message intercept strategy, or any other suitable strategy. In the probing strategy approach, a node 12 tunes to a visited channel 16, either immediately or otherwise sends a DDCS probe message, and then listens for a response to its probe message. This technique may be referred to as active scanning. In the listening strategy approach, a node 12 tunes to a visited channel 16 and listens for a probe message (e.g., a beacon) from another node 12. This technique may be referred to as passive scanning. In the message intercept strategy approach, a node 12 tunes to a visited channel 16 and attempts to intercept a message containing DDCS information transmitted between two other nodes 12. The message may not be dedicated for DDCS operation and may be a data or control message. In one embodiment, a combination of these approaches may be employed. This description focuses primarily on an embodiment in which a probing strategy is used to implement DDCS.

One or more DDCS core procedures may be used to implement DDCS. In one embodiment, the core procedures may include a channel probe procedure, a home channel selection procedure, and a home channel reselection procedure, although the present invention contemplates using any suitable number and types of core procedures to implement DDCS. Additionally, although the core procedures are described as separate procedures, the present invention contemplates the core procedures being integrated or otherwise combined in whole or in part according to particular needs. The channel probe procedure may establish a ranking between two nodes 12 and thus may cause a node 12 to change its home channel 16. The home channel selection and home channel reselection procedures may use the channel probe procedure to accomplish specific tasks, such as locating an initial home channel 16 or monitoring other channels 16 for other nodes 12.

FIG. 4 illustrates example states of DDCS probing nodes 12 and receiving nodes 12. A channel probe may occur in a number of scenarios. A node 12 may be homed—transmitting and receiving probe messages on its home channel 16—or may be visiting—transmitting and receiving probe message on a channel 16 other than its home channel 16, such as a visited channel 16 for example. A node 12 may be visiting with a home channel 16 (its current home channel 16 is valid), or may be visiting without a home channel 16 (its home channel 16 has been invalidated by an interferer or it has just powered-on or reset).

FIG. 5 illustrates an example format of a probe message 30 that may be sent by a DDCS node 12. In one embodiment, probe message 30 includes values for three node variables 32: a group ID variable 32a, a home channel variable 32b, and a switch count variable 32c. Switch count variable 32c may be referred to as a control variable, for reasons made clear below. Although a particular format is illustrated, the present invention contemplates probe message 30 having any suitable format according to particular needs. In one embodiment, probe message 30 is a broadcast message such that there is no destination address. In an embodiment in which other variables are used, probe message 30 may include other fields that specify values for the other variables. For example, in an embodiment in which a rank variable is used as an additional control variable, probe message 30 may include a rank value for this variable. In an example in which the probing node 12 does not currently have a home channel 16, the home channel value may be set to NO_HOME_CHANNEL or another suitable value to indicate this.

The transmission time of a probe message 30 may be determined by a medium access contention resolution procedure or in any other suitable manner. Alternatively, probe messages 30 may be transmitted at random times. In an example in which the medium access contention resolution procedure is used, the medium access contention resolution procedure may be designed to reduce the probability that multiple nodes 12 will transmit a probe message 30 at substantially the same time. If multiple nodes 12 transmit a probe message 30 at substantially the same time, then interference and possible loss of the probe messages 30 may result. The medium access contention resolution procedure, or another suitable procedure for determining the transmission time of probe messages 30, may be designed in any suitable manner according to particular needs.

Figure 6A:
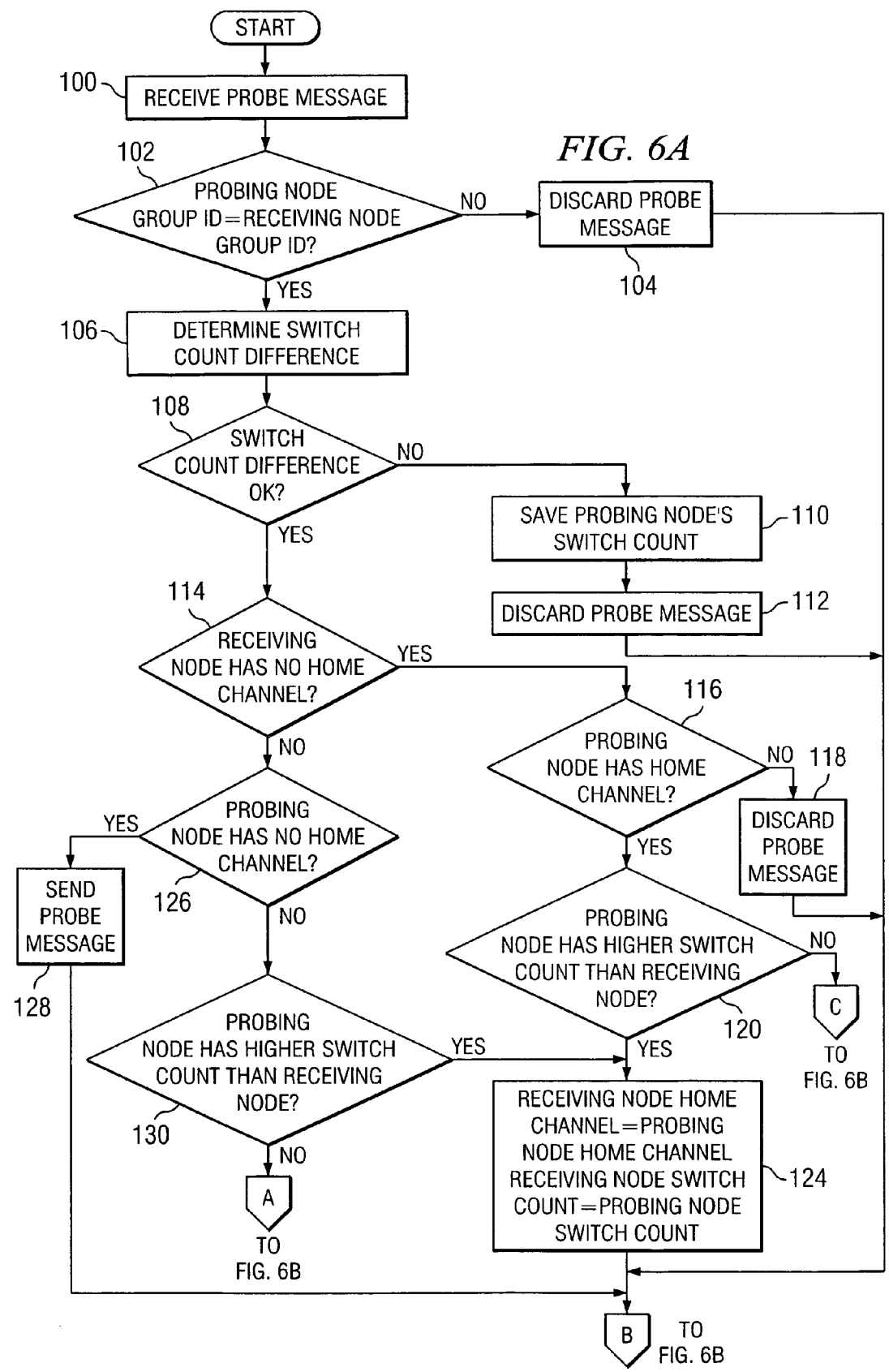

FIGS. 6A-6B illustrate an example method for processing a probe message 30 at a DDCS node 12. In one embodiment, this method applies to all scenarios described above with reference to FIG. 4. A node 12 receiving a probe message 30 may respond by ignoring the probe message 30, sending a probe message 30 in response, matching the home channel value of the probing node 12 (and thus switching to a new home channel 16) and incrementing its switch count value, or in any other suitable manner according to particular needs.

At step 100, a receiving node 12b receives a probe message 30 from a probing node 12a. At step 102, receiving node 12b determines whether its group ID value matches the group ID value of probing node 12a. If the group ID value of receiving node 12b does not match the group ID value of probing node 12a at step 102, then receiving node 12b discards the probe message 30 at step 104 and the method ends. Otherwise, if the group ID value of receiving node 12b matches the group ID value of probing node 12a at step 102, then receiving node 12b determines the difference between its switch count value and the switch count value of probing node 12a (i.e. switch count difference=switch count value of probing node 12a-switch count value of receiving node 12b) at step 106. At step 108, receiving node 12b determines whether the switch count difference is greater than a predetermined switch count difference maximum and whether the switch count value of probing node 12a has been previously received. If the switch count difference is greater than the predetermined switch count difference maximum at step 108 and the switch count value of probing node 12a has not been previously received, then receiving node 12b saves the switch count value of probing node 12a at step 110 and discards probe message 30 at step 112, and the method ends. Otherwise, if the switch count difference is not greater than the predetermined switch count difference maximum at step 108, then the method proceeds to step 114.

If receiving node 12b is determined based on its home channel value not to have a home channel 16 at step 114, then a determination is made as to whether the probing node 12 has a home channel 16 at step 116. If probing node 12a does not have a home channel 16 at step 116, then probe message 30 is discarded at step 118 and the method ends. If probing node 12a has a home channel 16 at step 116, then receiving node 12b determines whether probing node 12a has a higher switch count value than receiving node 12b at step 120. If probing node 12a has a lower switch count value than receiving node 12b at step 120, then receiving node 12b matches the home channel value of probing node 12a (and thus switches to a new home channel 16) and increments the switch count value of receiving node 12b at step 122, and the method ends. If probing node 12a has a higher switch count value than receiving node 12b at step 120, then receiving node 12b matches the home channel value (and thus switches to a new home channel 16) and the switch count value of probing node 12a at step 124, and the method ends.

Returning to step 114, if receiving node 12b is determined to have a home channel 16, then a determination is made as to whether probing node 12a has a home channel 16 at step 126. If probing node 12a does not have a home channel 16 at step 126, then receiving node 12b sends a probe message 30 at step 128 and the method ends. If probing node 12a has a home channel 16 at step 126, then receiving node 12b determines whether probing node 12a has a higher switch count value than receiving node 12b at step 130. If probing node 12a has a higher switch count value than receiving node 12b at step 130, then receiving node 12b matches the home channel value (and thus switches to a new home channel 16) and the switch count value of probing node 12a at step 124, and the method ends. If the switch count value of probing node 12a is not higher than the switch count value of receiving node 12b at step 130, then a determination is made as to whether the switch count value of probing node 12a is lower than the switch count value of receiving node 12b at step 132. If so at step 132, then receiving node 12b sends a probe message 30 at step 134 and the method ends. If not at step 132, then the switch count values of receiving node 12b and probing node 12a are equal, and receiving node 12b determines whether its home channel value is the same as the home channel value of probing node 12a at step 136.

If the home channel values of receiving node 12b and probing node 12a are determined to be equal at step 136, then receiving node 12b discards the probe message 30 at step 138 and the method ends. Otherwise, receiving node 12b matches the home channel value of probing node 12a (and thus switches to a new home channel 16) and increments the switch count value of receiving node 12a at step 122, and the method ends.

In one embodiment, if receiving node 12b changes its home channel 16 and discovers within a predetermined time that its new home channel 16 is unusable, then receiving node 12b may invalidate the home channel 16 and perform the home channel selection procedure described below with reference to FIG. 7. In one embodiment, a SWITCH_COUNT_THRESHOLD value may be predefined. In this embodiment, if the switch count value of receiving node 12b exceeds the SWITCH_COUNT_THRESHOLD value, then receiving node 12b may record the event in its internal data log for diagnostic purposes and may optionally display a warning message to the user.

The example method described above with reference to FIG. 6 includes using a single DDCS control variable, switch count variable 32c, to drive network formation or reformation. As discussed above, any suitable number and types of DDCS control variables may be used. In one embodiment, two DDCS control variables are used, switch count variable 32c and a rank variable. In this embodiment, the rank variable may be added as a field to probe message 30. In this example, when a node 12 sets its switch count value to zero or increments its switch count value, the node 12 may also randomize its rank value. If two nodes 12 have different switch count values, then the relative switch count alone may determine the home channel change behavior as described above with reference to FIG. 6. If two nodes 12 have the same switch count values, then the relative rank may determine the home channel change behavior. If two nodes 12 have the same switch count values and the same rank values, then the resulting home channel change behavior may be equivalent to single variable convergence when the switch count values are equal (see step 136 described above with reference to FIG. 6).

In one embodiment, using both a switch count variable and a rank variable as control variables to drive network formation and reformation may provide certain advantages relative to an embodiment using only the switch count variable. For example, lower maximum network reformation time over many network formations and reformations may result. As another example, a lower average number of channel changes over many network formations and reformations may result. As another example, successful network formation and reformation may rely less heavily on the randomization of the home channel reselection interval. For the dual control variable design, home channel reselection randomization may only be needed to prevent synchronization of home channel reselection invocations between nodes 12. For the single control variable design, home channel reselection randomization may also need to ensure that the order of home channel reselection invocations among nodes 12 is shuffled.

In one embodiment, using both a switch count variable and a rank variable as control variables to drive network 14 formation and reformation may provide certain disadvantages relative to an embodiment using only the switch count variable. For example, higher average formation time over many network formations and reformations may result. As another example, the dual variable design may be more complex to implement. As another example, the dual variable design may be more difficult to integrate into an existing MAC, PHY, or other protocol 24.

Adding additional DDCS control variables may provide similar advantages and disadvantages. A designer of a DDCS system may consider some or all of these various advantages and disadvantages, along with any other suitable considerations, when determining the number and types of DDCS control variables to use.

FIG. 7 illustrates an example method for performing the home channel selection procedure. A node 12 may invoke the home channel selection procedure when node 12 has no current home channel 16. For example, node 12 may have no home channel 16 after a power-on or reset. Upon power-on or reset, node 12 may set its home channel value to NO_HOME_CHANNEL and may set its switch count value to zero. Node 12 may then perform the home channel selection procedure to find a home channel 16. As another example, node 12 may have no home channel 16 when the current home channel 16 of node 12 is invalidated. Node 12 may invalidate its current home channel 16 when node 12 detects a primary user on the current home channel 16, detects excessive interference from other secondary users or unidentified sources on the current home channel 16, or in any other suitable situation as may be desirable.

At step 200, node 12 orders one or more channels 16 that are available to be scanned. In one embodiment, if node 12 does not have a previous home channel 16, the all channels 16 may be scanned for other nodes 12 from the node group 10 of node 12. If node 12 has a previous home channel 16, then all channels 16 except the previous home channel 16 may be scanned for other nodes 12 from the node group 10 of node 12. The available channels 16 may be ordered using any suitable method, according to particular needs. In one embodiment, the available channels 16 may be ordered sequentially. For example, if the previous home channel 16 of node 12 was channel 16c and there are four available channels 16 (channels 16a, 16b, 16c, and 16d), then the available channels 16 may be scanned in the order channel 16d, channel 16a, and channel 16b. Sequential ordering may increase the probability that a particular channel 16 will be selected for reformation relative to other channels 16, possibly causing unnecessary congestion when multiple node groups 10 select that channel 16 for reformation. In another embodiment, the available channels 16 may be ordered randomly. For example, if the previous home channel 16 of node 12 was channel 16c and there are four available channels 16 (channels 16a, 16b, 16c, and 16d), then the order in which channels 16a, 16b, and 16d will be scanned may be determined randomly. In another embodiment, the available channels 16 may be ordered from most active channel 16 to least active channel 16. For example, if the previous home channel 16 of node 12 was channel 16c and there are four available channels 16 (channels 16a, 16b, 16c, and 16d), then the order in which channels 16a, 16b, and 16d will be scanned may be determined by the amount of traffic on each channel 16. Because a node 12 executing the home channel selection procedure may be searching for another node 12, it may be desirable for the available channels 16 to be scanned in order of decreasing traffic to increase the probability that another node 12 will be found early in the search. Ordering available channels 16 from most active channel 16 to least active channel 16 assumes that a node 12 can measure traffic levels on visited channels 16 while the node 12 remains on its home channel 16.

At step 202, node 12 selects the next channel 16 to probe. At step 204, if node 12 determines that all available channels 16 have been probed (i.e. step 202 did not succeed), then node 12 determines whether a usable channel 16 is available at step 206. If a usable channel 16 is determined to be available at step 206, then node 12 concludes that no network 14 is found at step 208 and may perform a NO_NETWORK_FOUND subroutine described below with reference to FIG. 8. If a usable channel 16 is determined not to be available at step 206, then node 12 concludes that there is no usable channel 16 at step 210 and may perform a NO_USABLE_CHANNEL subroutine described below with reference to FIG. 9.

Returning to step 204, if node 12 finds a channel 16 to probe (i.e. a visited channel 16), then node 12 determines if the visited channel 16 is usable at step 212. For example, node 12 may listen for a primary user or excessive interference on the visited channel 16. If the visited channel 16 is determined to not be usable at step 212, then the method returns to step 202 and node 12 selects the next channel 16 to probe. If the visited channel 16 is determined to be usable at step 212, then node 12 sends a probe message 30 on the visited channel 16 at step 214 and waits to receive a probe message 30 in response. If node 12 does not receive a probe message 30 in response at step 216, then node 12 measures and stores the interference level on the visited channel 16 at step 218. Node 12 then returns to step 202 and selects a next channel 16 to probe. If node 12 receives a probe message 30 in response at step 216, then node 12 changes its home channel 16 to the probed channel 16 at step 220 (and sets its home channel variable accordingly) as described above with reference to FIG. 5.

In one embodiment, if node 12 does not find another node 12 from its node group 10 on any channel 16, then node 12 invokes the NO_NETWORK_FOUND subroutine if a usable channel 16 was detected during its search for a channel 16 (i.e. it was able to send a probe message 30 on at least one channel 16). Otherwise, node 12 may invoke the NO_USABLE_CHANNEL subroutine.

Figure 8:
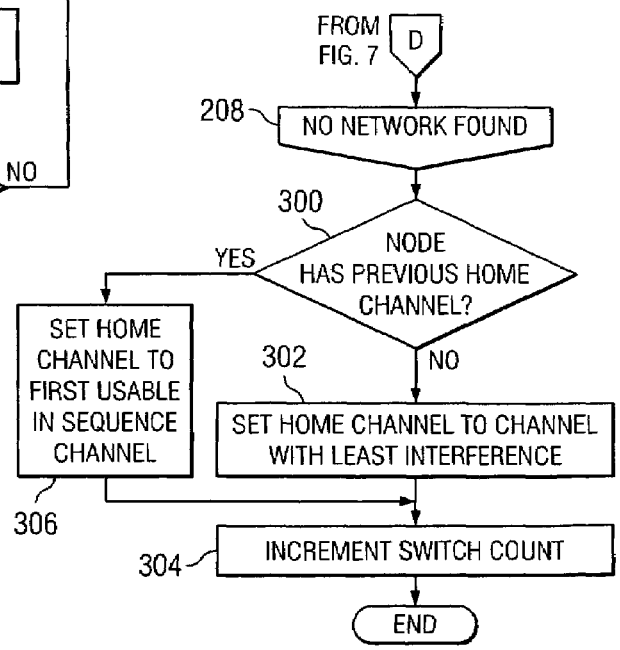
FIG. 8 illustrates an example NO_NETWORK_FOUND subroutine.

FIG. 8 illustrates an example NO_NETWORK_FOUND subroutine. At step 300, node 12 determines whether it has a previous home channel 16. For example, node 12 may not have a previous home channel 16 if the home channel selection procedure was invoked due to a power-on or reset. If node 12 does not have a previous home channel 16 at step 300, then at step 302 node 12 may change its home channel 16 to the channel 16 with the least interference (and set its home channel variable accordingly). Node 12 may increment its switch count variable at step 304. Returning to step 300, if node 12 determines that it has a previous home channel 16, then node 12 may change its home channel 16 to the first usable channel 16 relative to its previous home channel 16 at step 306. For example, if the previous home channel 16 of node 12 is channel 16b and channel 16c is unusable, then node 12 may change its new home channel 16 to channel 16d. Node 12 may increment its switch count variable at step 304. After the NO_NETWORK_FOUND subroutine has been performed, node 12 may have founded a new network 14 containing one node 12 (itself) on the new home channel 16. Node 12 may then wait for other nodes 12 within its node group 10 to join it on the new home channel 16.

Figure 9:
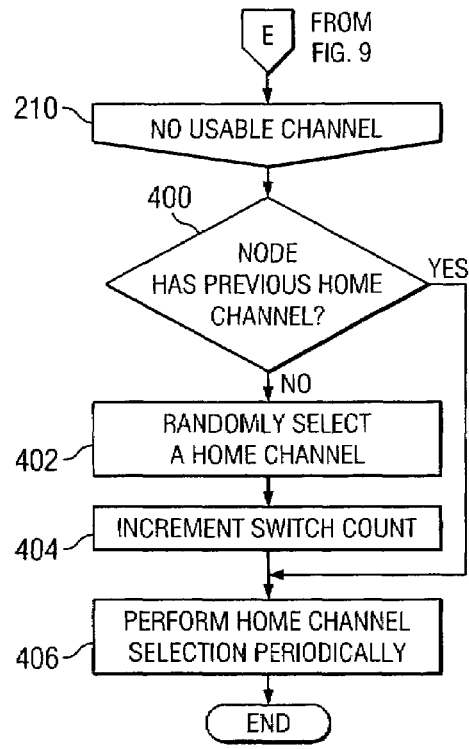
FIG. 9 illustrates an example NO_USABLE_CHANNEL found subroutine.

FIG. 9 illustrates an example NO_USABLE_CHANNEL found subroutine. At step 400, a node 12 determines whether it has a previous home channel 16. If node 12 does not have a previous home channel 16 at step 400, then at step 402 node 12 may randomly select one of the available channels 16 as its home channel 16. At step 404, node 12 may increment its switch count variable. At step 406, node 12 may periodically perform the home channel selection procedure. Returning to step 400, if node 12 has a previous home channel 16, then node 12 may remain on its previous home channel 16, proceed to step 406, and periodically perform the home channel selection procedure. In one embodiment, node 12 may not be allowed to transmit probe messages 30 while it remains on its home channel 16 in the presence of an interferer.

Figure 10:
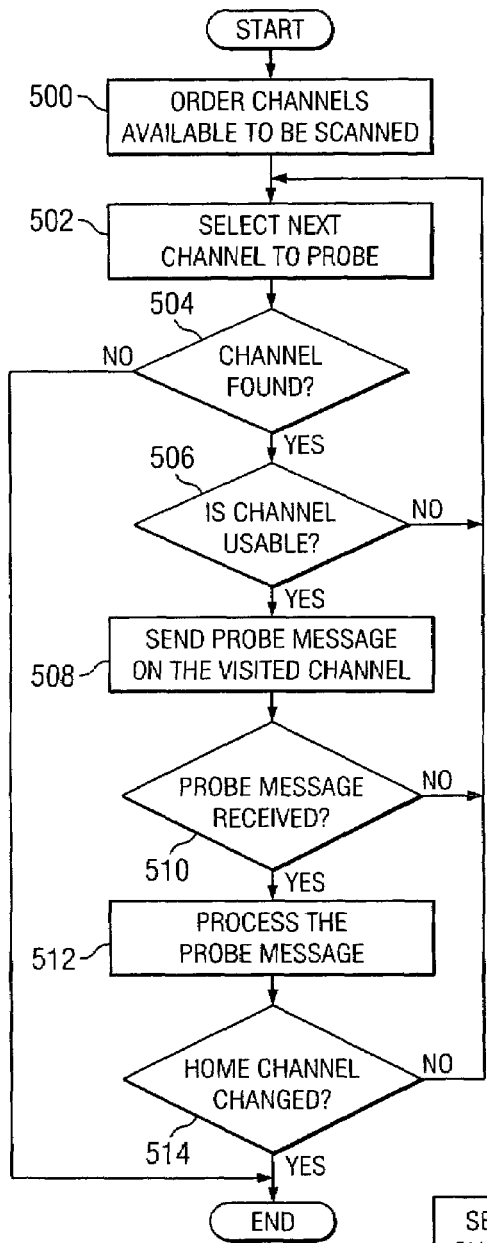
FIG. 10 illustrates an example method for performing a home channel reselection procedure.

FIG. 10 illustrates an example method for performing the home channel reselection procedure. A node 12 may invoke the home channel reselection procedure when it has a valid home channel 16 and probes other channels 16 for other networks 14 with nodes 12 having the same group ID value as the probing node 12. At step 500, a node 12 orders one or more channels 16 that are available to be scanned. In one embodiment, all channels 16 except a current home channel 16 of node 12 (if node 12 currently has a home channel 16) may be scanned for other nodes 12 from the node group 10 of node 12. The available channels 16 may be ordered using any suitable method as described above with reference to step 200 in FIG. 7. In one embodiment, the ordering of available channels 16 need not be the same for both the home channel selection and home channel reselection procedures.

At step 502, a probing node 12 selects a channel 16 to probe. At step 504, if probing node 12 determines that all available channels 16 have been probed (i.e. step 502 did not succeed), then the method ends. If probing node 12 finds a channel 16 to probe (i.e. a visited channel 16) at step 504, then probing node 12 determines if the visited channel 16 is usable at step 506. For example, probing node 12 may listen for a primary user or excessive interference on the visited channel 16. If the visited channel 16 is determined to not be usable at step 506, then the method returns to step 502 and probing node 12 selects a next channel 16 to probe. If the visited channel 16 is determined to be usable at step 506, then probing node 12 sends a probe message 30 on the visited channel 16 at step 508. At step 510, probing node 12 determines if it received a return probe message 30. If probing node 12 does not receive a return probe message 30 at step 510, then probing node 12 returns to step 502 and selects a next channel 16 to probe. If probing node 12 receives a return probe message 30 at step 510, then probing node 12 processes the return probe message 30 at step 512. In one embodiment, probing node 12 processes the return probe message 30 according to the method described above with reference to FIG. 6. At step 514, probing node 12 determines whether its home channel 16 changed as a result of processing the return probe message 30. If the home channel 16 of probing node 12 did not change, then probing node 12 returns to step 502 and selects a next channel 16 to probe. If the home channel 16 of probing node 12 changed, then the method ends.

Each node 12 may invoke the home channel reselection procedure at any suitable interval. In one embodiment, each node 12 randomizes the interval between its invocations of the home channel reselection procedure. Randomization may prevent two nodes 12 with different home channels 16 from permanently synchronizing their invocations of the home channel reselection procedure, possibly precluding a probe message 30 exchange and possibly preventing network formation or reformation. The randomization of the invocation intervals of the home channel reselection procedure may also change the order in which nodes 12 invoke the home channel reselection procedure, which may be necessary for network formation or reformation in certain scenarios. In one embodiment, the home channel reselection procedure interval may be selected with equal probability from a range of values between −25% and +25% of the nominal interval.

It may be possible to construct scenarios in which it is impossible for all nodes 12 from the same node group 10 to find a single channel 16 on which to establish data-plane communication. For example, if there are four nodes 12 in a node group 10, four available channels 16, and one interferer per channel 16 such that each interferer interferes with a different node 12, then nodes 12 may cycle endlessly among all available channels 16 searching for the single non-existent channel 16 on which they can establish a complete network 14. This endless channel cycling may be undesirable because data transfers among nodes 12 may be continually interrupted as nodes 12 change home channels 16.

In one embodiment, to address this problem, nodes 12 implement a mechanism to detect when channel cycling is occurring. When channel cycling is detected, nodes 12 may implement a mechanism to reduce the channel change rate, thereby improving data transfer operations. The channel cycling detection mechanism and channel change rate reduction mechanism may be designed in any suitable manner according to particular needs.

In one embodiment, the detection of channel cycling is complicated by the fact that there are scenarios in which multiple channel changes by a node 12 within a short period of time is expected and desirable behavior. Therefore, the channel cycling detection mechanism should not immediately reduce the channel change rate when a node 12 changes channels 16 within a short period. However, if a node 12 changes channels N times within a short period, where N is greater than the number of available channels 16, then the channel change rate should be reduced.

In one embodiment, introducing a delay between the time of interferer detection and home channel selection procedure activation may reduce the channel change rate. During this time, a node 12 may not be permitted to transmit probe messages 30 due to the presence of the interferer. A linear or exponential back-off scheme may be employed to introduce progressively greater delays if channel cycling continues.

Certain optional DDCS procedures may be implemented in addition to the DDCS core procedures described above. These optional DDCS procedures may improve the performance of network formation and reformation. The optional DDCS procedures may include one or more home channel notification procedures, a home channel announcement procedure, a current channel change delay procedure, or any other suitable procedures.

The one or more home channel notification procedures generally allow a node 12 to notify other nodes 12 on its previous home channel 16 that it has changed (or will be changing) to a new home channel 16. It may be desirable for a node 12 to perform the one or more home channel notification procedures in one or more of the following situations: idle time, home channel selection, and home channel reselection.

A first node 12a may invoke a home channel notification/IDLE (HCN/IDLE) procedure when it receives a probe message 30 on its home channel 16 from a second node 12b having an equal or higher switch count value. Before changing its home channel 16, the receiving first node 12a may broadcast a probe message 30 indicating its future home channel 16 and new switch count value. The receiving first node 12a thus effectively extends the broadcast range of the second node 12b by rebroadcasting its switch count value. This may cause additional nodes 12 on the home channel 16 of the receiving first channel 12a to change channels 16, possibly reducing the time required for the network 14 to reform on the new home channel 16.

A first node 12a may invoke a home channel notification/home channel selection (HCN/HCS) procedure when first node 12a receives a probe message 30 from a second node 12b while first node 12a is performing home channel selection after invalidating its current home channel 16. In one embodiment, a node 12 without a previous home channel 16 (e.g., after power-on or reset) cannot use the HCN/HCS procedure. A first node 12a that has a previous home channel and is performing the HCN/HCS procedure may return to its previous home channel 16 and broadcast a probe message 30. This probe message 30 may notify nodes 12 within range on the previous home channel 16 of first node 12a that first node 12a now has a new home channel 16, possibly attracting those nodes 12 to the new home channel 16 of first node 12a. This may reduce the time required for the network 14 to reform on the new home channel 16. In one embodiment, the HCN/HCS procedure may not be usable in all instantiations on the DDCS protocol. For example, if lack of interference with a primary user is of highest priority, then a node 12 may not be able to return to its previous home channel 16 and broadcast a probe message 30 because this transmission may interfere with the primary user that caused the node 12 to invalidate its previous home channel 16 and start the home channel selection procedure.

A first node 12a may invoke a home channel notification/home channel reselection (HCN/HCR) procedure when first node 12a receives a probe message 30 from a second node 12b having an equal or higher switch count value while first node 12a is performing home channel reselection. First node 12a performing the HCN/HCR procedure may return to its previous home channel 16 and broadcast a probe message 30. This may notify nodes 12 within range on the previous home channel 16 of first node 12a that first node 12a now has a new home channel 16, possibly attracting those nodes 12 to the new home channel 16 of first node 12a. This may reduce the time required for the network 14 to reform on the new home channel 16.

The home channel announcement procedure may include a node 12 sending a probe message 30 on the current home channel 16 of node 12. Node 12 may do this to reduce variation in switch count values among the nodes 12 comprising network 14. Switch count value variation within network 14 may cause transient oscillatory behavior when the nodes 12 comprising network 14 transition to another home channel 16. This transient instability may increase the time required for the nodes 12 to effect the home channel change.

A first node 12a may invoke the current channel change delay (CCCD) procedure after receiving a probe message 30 while in an IDLE state from a second node 12b having an equal or higher switch count value. First node 12a may wait to receive a probe message 30 from one of its neighboring nodes 12 before first node 12a changes its home channel 16 to the home channel 16 of second node 12b. If first node 12a receives a probe message 30 from a neighboring node 12 because the neighboring node 12 also received the probe message 30 from second node 12b, then the neighboring node 12 has a higher switch count value than second node 12b and first node 12a should stay on its current home channel 16 rather than change its home channel 16 to the home channel 16 of second node 12b. The CCCD procedure may reduce the number of channel changes required during network formation or reformation.

In one embodiment, the CCCD and HCN/IDLE procedures both have the same triggering condition—the receipt of a probe message 30 while in the IDLE state from a node 12 with equal or higher switch count value. In an embodiment that includes both the CCCD and the HCN/IDLE procedures, it may be necessary to devise a strategy to avoid conflict between the two procedures. An example strategy includes performing the CCCD procedure and then performing the HCN/IDLE procedure.

Figure 11C:
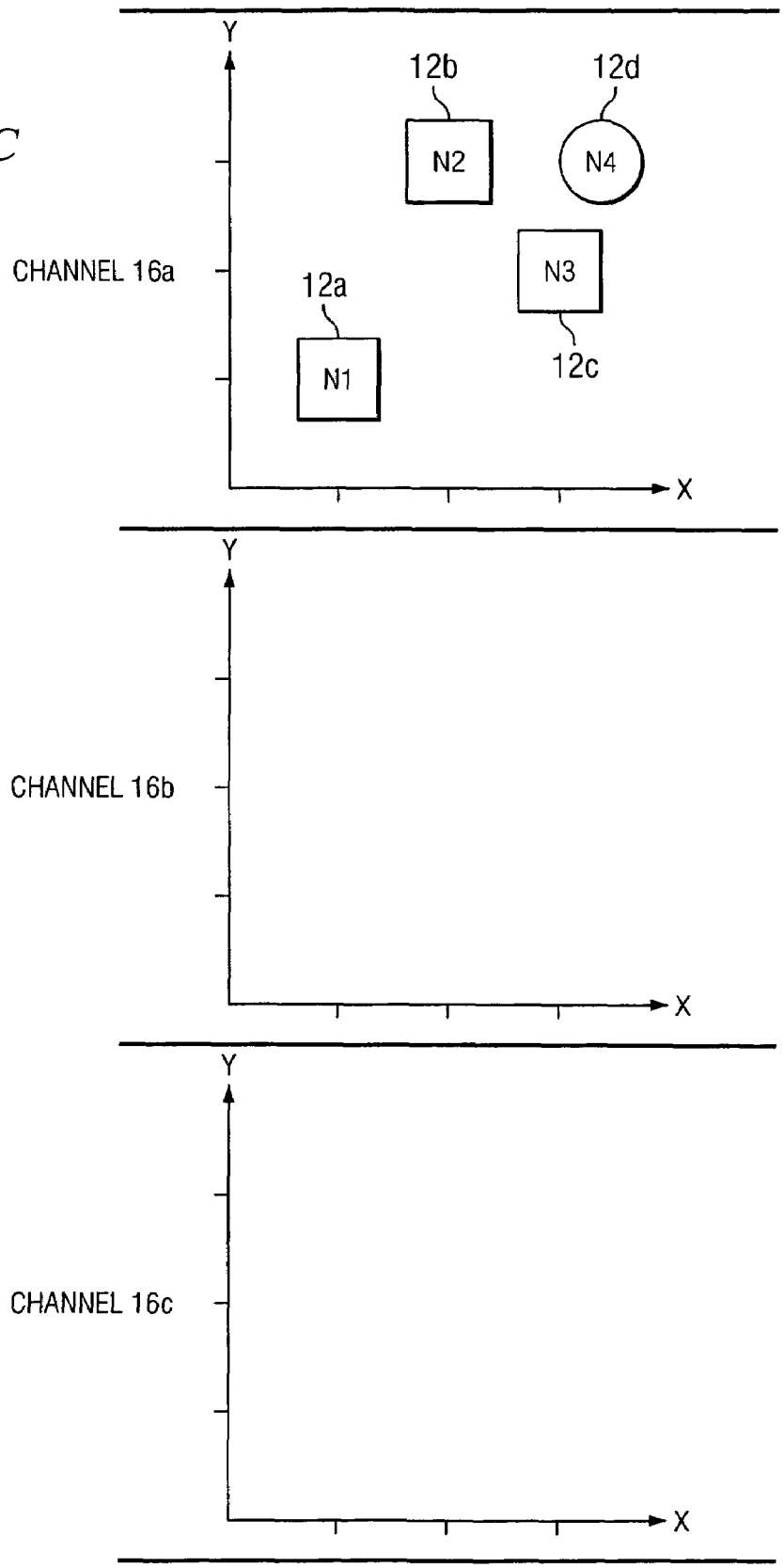
Figure 11D:
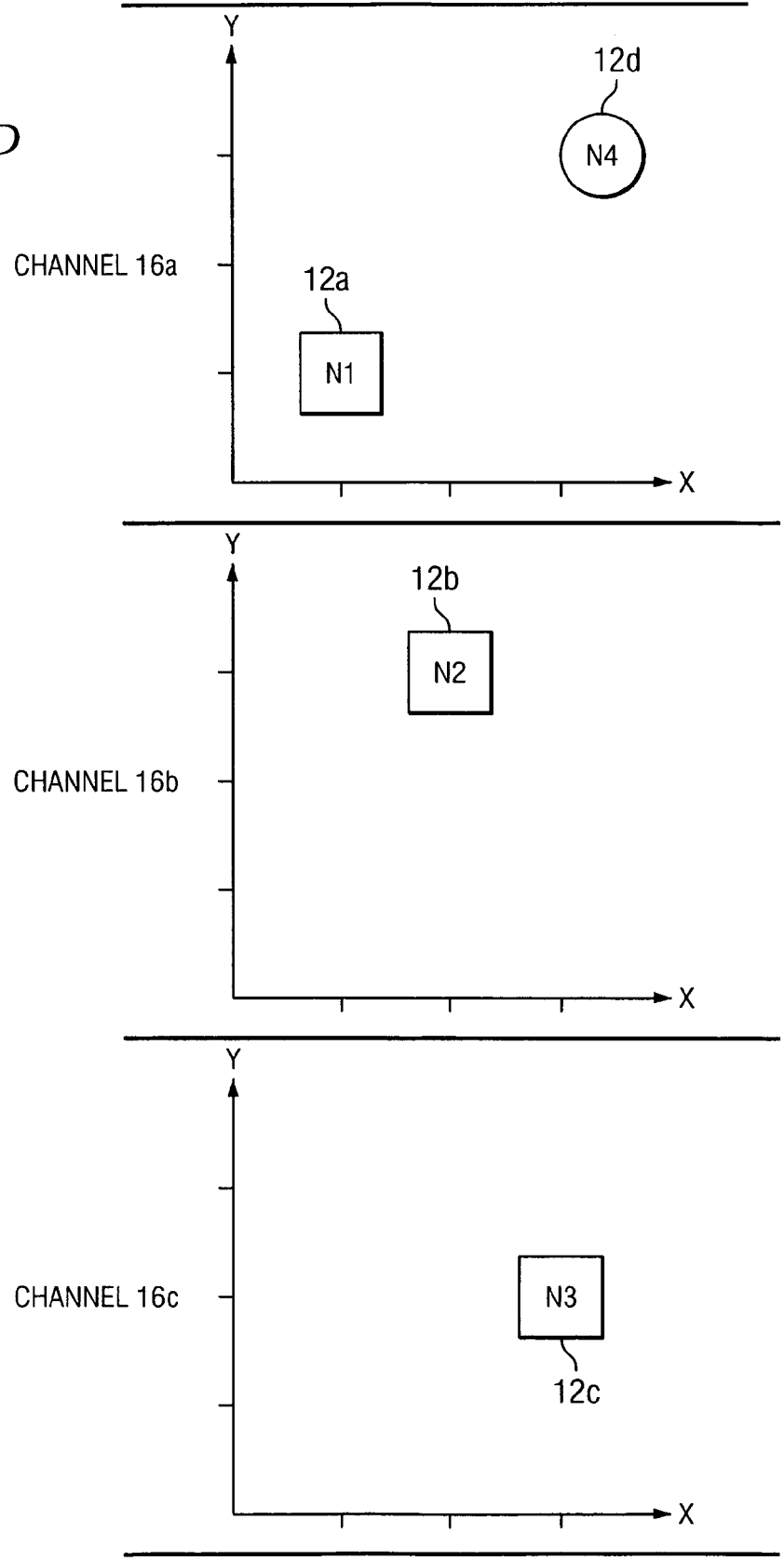

FIGS. 11A through 11I illustrate an example scenario in which the DDCS protocol is used to reform a network 14 among a node group 10. The particular example illustrated in FIGS. 11A through 11I provides an example in which the DDCS protocol may reform network 14 on a new channel 16 despite temporary fragmentation of network 14 across multiple channels 16 during the channel change process. FIG. 11A illustrates network 14 established on channel 16a. This example assumes that node 12a has link-level connectivity only with node 12b and that node 12b has link-level connectivity only with node 12c. Node 12a and node 12c have network-level connectivity using an ad-hoc routing protocol. The group ID variable, home channel variable, and switch count variable values for nodes 12a, 12b, and 12c are illustrated in FIG. 11B. FIG. 11C illustrates that an interferer, node 12d, is newly active near nodes 12b and 12c. Nodes 12b and 12c may decide to change home channels 16 based on the interference level due to node 12d.

As illustrated in FIG. 1D, node 12b changed its home channel 16 to channel 16b, and node 12c changed its home channel 16 to channel 16c. The failure of nodes 12b and 12c to find each other as they each executed the home channel selection procedure may be due to a temporary signaling failure between the nodes 12b and 12c. For example, node 12c may select channel 16c but miss the probe message 30 from node 12b, leading node 12b to incorrectly conclude that no DDCS network 14 exists on channel 16c. The group ID variable, home channel variable, and switch count variable values for nodes 12a, 12b, and 12c are illustrated in FIG. 11E.

Figure 11F:
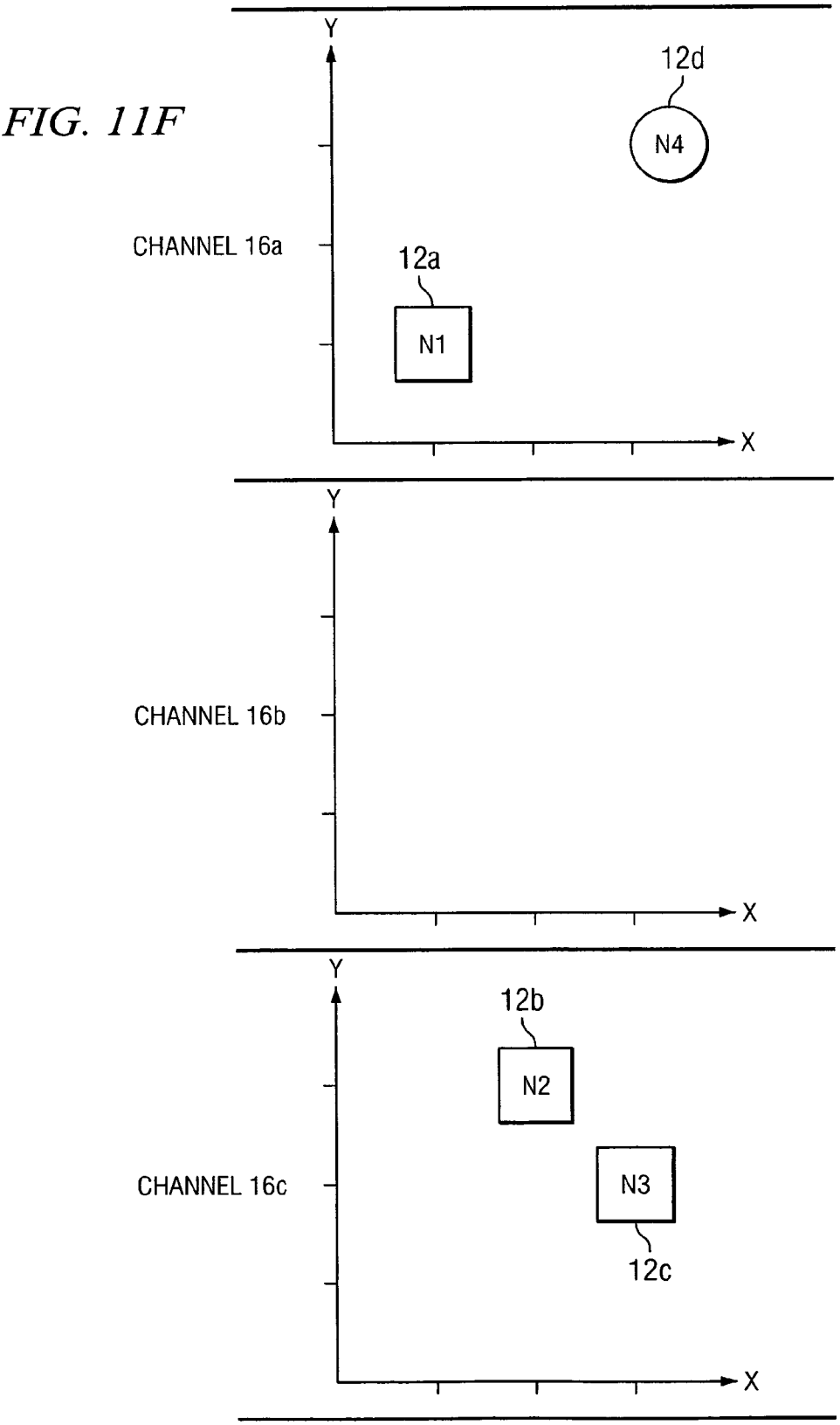

In one embodiment, as part of its home channel reselection procedure, node 12c may send a probe message 30 on channel 16b. As illustrated in FIG. 11F, node 12b may receive probe message 30 and change its home channel 16 to channel 16c. FIG. 11G illustrates the group ID variable, home channel variable, and switch count variable values for nodes 12a, 12b, and 12c. In an alternative embodiment, as part of its home channel reselection procedure, node 12b may have sent a probe message 30 on channel 16c. Upon receipt of probe message 30, node 12c may change its home channel 16 to channel 16b. The result may be the same: nodes 12b and 12c sharing the same home channel 16 (although channel 16b is shared instead of channel 16c).

Figure 11H:
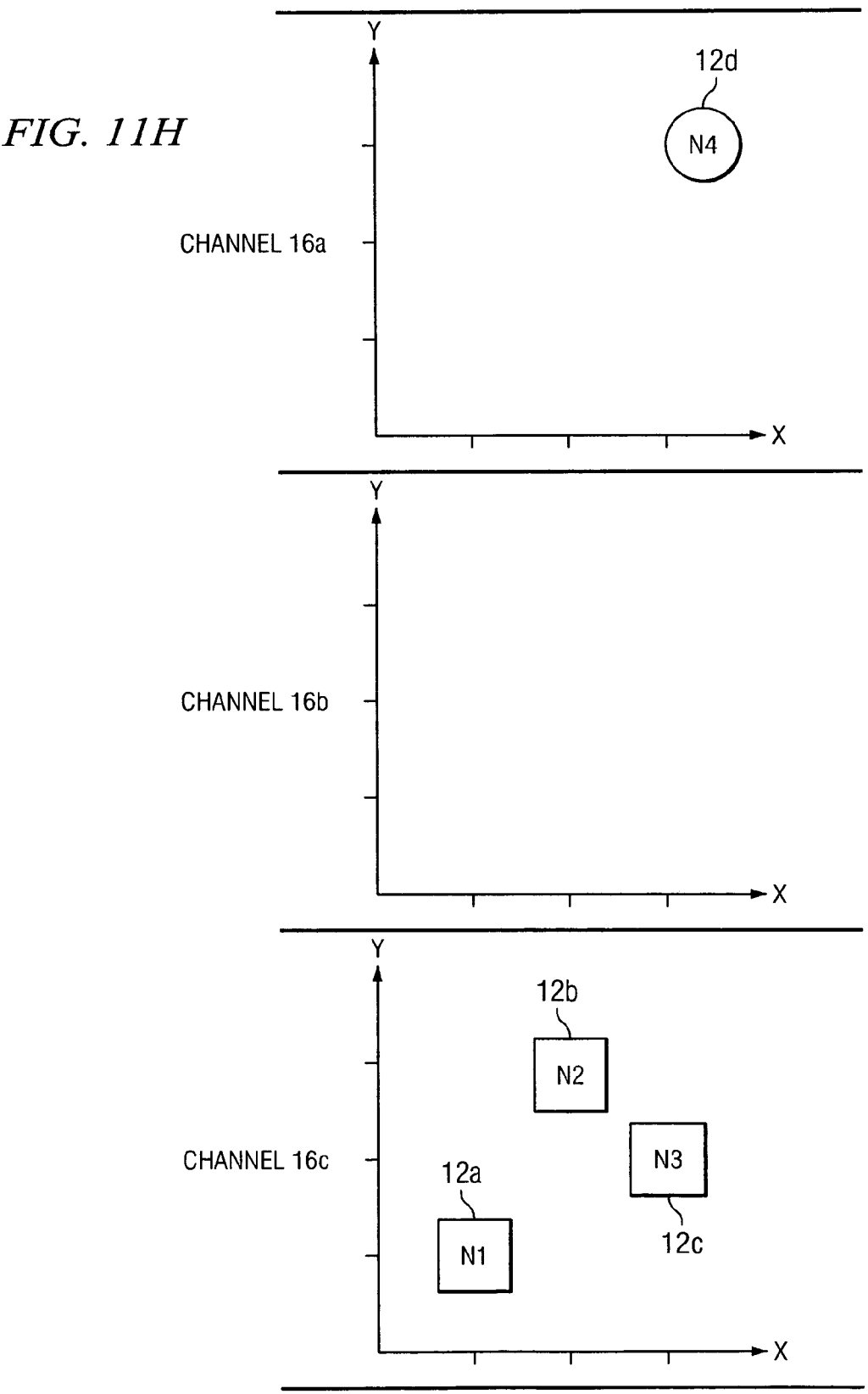

As illustrated in FIG. 11H, node 12a may send a probe message 30 on channel 16c as part of the home channel reselection procedure of node 12a. Because the switch count value of node 12b is greater than the switch count value of node 12c, node 12b may send a probe message 30 to node 12a in reply. Node 12a may then change its home channel 16 to channel 16c. FIG. 11I illustrates the group ID variable, home channel variable, and switch count variable values of nodes 12a, 12b, and 12c. In this example, as shown in FIG. 11H, network 14 has completed its transition from channel 16a to channel 16c due to the interference of node 12d on channel 16a. The DDCS protocol ensured that network 14 eventually consolidated on a single channel 16 (channel 16c) despite temporary fragmentation of network 14 across multiple channels 16.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A first node among a plurality of distributed nodes capable of forming or reforming a communication network between the plurality of distributed nodes, each of the plurality of distributed nodes comprising functionally similar components for forming or reforming such a network, the first node comprising:

a memory for storing values for one or more node variables for the first node; and one or more components collectively operable to:

spontaneously and independent of a centralized controller associated with the network, transmit a probe message to one or more other nodes in the plurality of distributed nodes for purposes of forming or reforming a network;

receive a probe message from a second node, the probe message comprising values for one or more node variables for the second node;

compare the values for the one or more node variables for the first node to the values for the one or more node variables for the second node within the probe message to determine, independent of a centralized controller associated with the network, whether the first node should set itself to a new channel; and if it is determined that the first node should set itself to the new channel, set the first node to the new channel wherein the one or more node variables for a node comprise:

a home channel variable identifying whether the node currently has a home channel on which the node has data-plane connectivity with other nodes within a node group of the node and, if so, identifying the home channel of the node; and a switch count variable reflecting a number of times that the node has changed home channels.

2. The first node of claim 1, further operable to set the value for the switch count variable for the first node to zero if the first node does not currently have a home channel.

3. The first node of claim 1, further operable to, if the first node currently has a home channel and the second node does not currently have a home channel, communicate a probe message to the second node in response to the probe message received from the second node to prompt the second node to switch to the current home channel of the first node.

4. The first node of claim 1, further operable to, if the first node currently has a home channel, if the second node currently has a home channel, and if the value for the switch count variable for the first node is greater than the value for the switch count variable for the second node, communicate a probe message to the second node in response to the probe message received from the second node, the second node processing the probe message communicated to the second node to determine whether the second node should set itself to the current home channel of the first node.

5. The first node of claim 1, further operable to, whether or not the first node currently has a home channel, if the second node currently has a home channel and the value for the switch count variable for the first node is less than the value for the switch count variable for the second node:

set the first node to the home channel of the second node; and set the value for the switch count variable for the first node to the value for the switch count variable for the second node.

6. The first node of claim 1, further operable to, if the first node currently has a home channel, if the second node currently has a home channel, if the value for the switch count variable of the first node is equal to the value for the switch count variable for the second node, and if the value for the home channel variable for the first node is different than the value for the home channel variable for the second node:

set the first node to the home channel of the second node; and increment the value for the switch count variable for the first node.

7. The first node of claim 1, further operable to, if the first node does not currently have a home channel, if the second node currently has a home channel, and if the value for the switch count variable for the first node is greater than or equal to the value for the switch count variable for the second node:
set the first node to the home channel of the second node; and
increment the value for the switch count variable for the first node.

8. The first node of claim 1, further operable to discard the probe message if one or more of the following conditions is true:
a switch count difference determined after receipt of the probe message is greater than a predetermined switch count difference threshold, the switch count difference being a difference between the value for the switch count variable for the first node and the value for the switch count variable for the second node;
the first node does not currently have a home channel and the second node does not currently have a home channel; and
the value for the switch count variable for the first node is equal to the value for the switch count variable for the second node and the value for the home channel variable for the first node is equal to the value for the home channel variable of the second node.

9. The first node of claim 1, wherein:
the one or more node variables further comprise a rank variable; and
the first node is further operable to compare a value for the rank variable for the first node to a value for the rank variable for the second node if the value for the switch count variable for the first node matches the value for the switch count variable for the second node, this comparison being used to determine whether the first node should set itself to the new channel.

10. The first node of claim 9, further operable to randomize the rank variable upon the occurrence of one or more conditions.

11. The first node of claim 1, further operable to, if it is determined that the first node should not set itself to the new channel, discard the probe message received from the second node.

12. The first node of claim 1, wherein if the first node currently has a home channel and it is determined that the first node should not set itself to the new channel, then the first node remains on its home channel.

13. The first node of claim 1, further operable to, if the first node currently has a home channel and it is determined that the first node should not set itself to a new channel, communicate a probe message to the second node.

14. The first node of claim 1, further operable to, if the first node does not currently have a home channel on which the first node has data-plane connectivity with one or more other nodes within a node group of the first node, spontaneously transmit, independent of receiving the probe message from the second node, one or more probe messages to one or more other nodes in the plurality of distributed nodes for purposes of determining an initial channel on which to form a network.

15. The first node of claim 1, further operable to, if the first node has a current home channel on which the first node has data-plane connectivity with one or more other nodes within a node group of the first node, communicate a notification to the other nodes within the node group on the current home channel of the first node if it is determined that the first node should set itself to the new channel, the notification indicating to the other nodes that the first node is setting itself to the new channel.

16. The first node of claim 1, wherein:
a home channel of a node comprises a channel that provides data-plane connectivity between the node and one or more other nodes within a node group of the node;
a visited channel of a node comprises a channel that provides temporary control-plane connectivity between the node and one or more other nodes for purposes of transmitting or receiving one or more probe messages to the other nodes, and
one of the following is true:
the first node currently has a home channel that is a current visited channel of the second node;
the first node currently has a home channel that is a current home channel of the second node;
the first node currently has a visited channel that is a current home channel of the second node; and
the first node currently has a visited channel that is a current visited channel of the second node.

17. The first node of claim 1, further operable to, if the first node currently has a home channel, spontaneously transmit, independent of receiving the probe message from the second node, one or more probe messages to one or more other nodes in the plurality of distributed nodes in one or more of the following situations:
the one or more other nodes to which the one or more probe messages are spontaneously transmitted are not on the home channel of the first node, the one or more probe messages being spontaneously transmitted for purposes of:
determining whether the first node should change its current home channel; or
scanning channels other than the current home channel of the first node for other nodes to which to transmit probe messages; and
the one or more other nodes to which the one or more probe messages are spontaneously transmitted currently have the same home channel as the first node, the one or more probe messages being spontaneously transmitted for purposes of transmitting a beacon on the current home channel of the first node.

18. The first node of claim 1, wherein the communication network comprises a wireless ad-hoc network, the first node comprising a channel-agile mobile terminal within the wireless ad-hoc network.

19. The first node of claim 1, wherein the communication network comprises a wireless infrastructure network, the first node comprising either a mobile station or a base station within the wireless infrastructure network.

20. The first node of claim 1, further operable to:
determine one or more channels available to be scanned for purposes of forming or reforming a network; and
order the available channels for purposes of, if the available channel is determined to be usable, spontaneously transmitting one or more probe messages to one or more other nodes on the available channel.

21. The first node of claim 20, further operable to, if the first node currently has a home channel, scan one or more of the available channels other than the current home channel of the first node in response to the first node determining that its current home channel is invalid.

22. The first node of claim 21, further operable to, if the first node fails to locate another node on an available channel while scanning the one or more available channels in response to the first node determining that its current home channel is invalid, set a next in-sequence channel that is determined to be usable as the next home channel of the first node.

23. A method performed at a first node among a plurality of distributed nodes, the first node capable of forming or reforming a communication network between the plurality of distributed nodes, each of the plurality of distributed nodes comprising functionally similar components for forming or reforming such a network, the method comprising:

storing values for one or more node variables for the first node;

spontaneously and independent of a centralized controller associated with the network, transmitting a probe message to one or more other nodes in the plurality of distributed nodes for purposes of forming or reforming a network;

receiving a probe message from a second node, the probe message comprising values for one or more node variables for the second node;

comparing the values for the one or more node variables for the first node to the values for the one or more node variables for the second node within the probe message to determine, independent of a centralized controller associated with the network, whether the first node should set itself to a new channel; and if it is determined that the first node should set itself to the new channel, setting the first node to the new channel wherein the one or more node variables for a node comprise:

a home channel variable identifying whether the node currently has a home channel on which the node has data-plane connectivity with other nodes within a node group of the node and, if so, identifying the home channel of the node; and a switch count variable reflecting a number of times that the node has changed home channels.

24. The method of claim 23, further comprising setting the value for the switch count variable for the first node to zero if the first node does not currently have a home channel.

25. The method of claim 23, further comprising, if the first node currently has a home channel and the second node does not currently have a home channel, communicating a probe message to the second node in response to the probe message received from the second node to prompt the second node to switch to the current home channel of the first node.

26. The method of claim 23, further comprising, if the first node currently has a home channel, if the second node currently has a home channel, and if the value for the switch count variable for the first node is greater than the value for the switch count variable for the second node, communicating a probe message to the second node in response to the probe message received from the second node, the second node processing the probe message communicated to the second node to determine whether the second node should set itself to the current home channel of the first node.

27. The method of claim 23, further comprising, whether or not the first node currently has a home channel, if the second node currently has a home channel and the value for the switch count variable for the first node is less than the value for the switch count variable for the second node:

setting the first node to the home channel of the second node; and setting the value for the switch count variable for the first node to the value for the switch count variable for the second node.

28. The method of claim 23, further comprising, if the first node currently has a home channel, if the second node currently has a home channel, if the value for the switch count variable for the first node is equal to the value for the switch count variable for the second node, and if the value for the home channel variable for the first node is different than the value for the home channel variable for the second node:

setting the first node to the home channel of the second node; and incrementing the value for the switch count variable for the first node.

29. The method of claim 23, further comprising, if the first node does not currently have a home channel, if the second node currently has a home channel, and if the value for the switch count variable for the first node is greater than or equal to the value for the switch count variable for the second node:

setting the first node to the home channel of the second node; and incrementing the value for the switch count variable for the first node.

30. The method of claim 23, further comprising discarding the probe message if one or more of the following conditions is true:

a switch count difference determined after receipt of the probe message is greater than a predetermined switch count difference threshold, the switch count difference being a difference between the value for the switch count variable for the first node and the value for the switch count variable for the second node;

the first node does not currently have a home channel and the second node does not currently have a home channel; and the value for the switch count variable for the first node is equal to the value for the switch count variable for the second node and the value for the home channel variable for the first node is equal to the value for the home channel variable of the second node.

31. The method of claim 23, wherein:

the one or more node variables further comprise a rank variable; and the method further comprises comparing a value for the rank variable for the first node to a value for the rank variable for the second node if the value for the switch count variable for the first node matches the value for the switch count variable for the second node, this comparison being used to determine whether the first node should set itself to the new channel.

32. The method of claim 31, further comprising randomizing the value for the rank variable upon the occurrence of one or more conditions.

33. The method of claim 23, further comprising, if it is determined that the first node should not set itself to the new channel, discarding the probe message received from the second node.

34. The method of claim 23, wherein if the first node currently has a home channel and it is determined that the first node should not set itself to the new channel, then the first node remains on its home channel.

35. The method of claim 23, further comprising, if the first node currently has a home channel and it is determined that the first node should not set itself to a new channel, communicating a probe message to the second node.

36. The method of claim 23, further comprising, if the first node does not currently have a home channel on which the first node has data-plane connectivity with one or more other nodes within a node group of the first node, spontaneously transmitting, independent of receiving the probe message from the second node one or more probe messages to one or more other nodes in the plurality of distributed nodes for purposes of determining an initial channel on which to form a network.

37. The method of claim 23, further comprising, if the first node currently has a home channel on which the first node has data-plane connectivity with one or more other nodes within a node group of the first node, communicating a notification to the other nodes within the node group on the current home channel of the first node if it is determined that the first node should set itself to the new channel, the notification indicating to the other nodes that the first node is setting itself to the new channel.

38. The method of claim 23, wherein:
   a home channel of a node comprises a channel that provides data-plane connectivity between the node and one or more other nodes within a node group of the node;
   a visited channel of a node comprises a channel that provides temporary control-plane connectivity between the node and one or more other nodes for purposes of transmitting or receiving one or more probe messages to the other nodes, and
   one of the following is true:
      the first node currently has a home channel that is a current visited channel of the second node;
      the first node currently has a home channel that is a current home channel of the second node;
      the first node currently has a visited channel that is a current home channel of the second node; and
      the first node currently has a visited channel that is a current visited channel of the second node.

39. The method of claim 23, further comprising, if the first node currently has a home channel, spontaneously transmitting, independent of receiving the probe message from the second node, one or more probe messages to one or more other nodes in the plurality of distributed nodes in one or more of the following situations:
   the one or more other nodes to which the one or more probe messages are spontaneously transmitted are not on the home channel of the first node, the one or more probe messages being spontaneously transmitted for purposes of:
      determining whether the first node should change its current home channel; or
      scanning channels other than the current home channel of the first node for other nodes to which to transmit probe messages; and
   the one or more other nodes to which the one or more probe messages are spontaneously transmitted currently have the same home channel as the first node, the one or more probe messages being spontaneously transmitted for purposes of transmitting a beacon on the current home channel of the first node.

40. The method of claim 23, wherein the communication network comprises a wireless ad-hoc network, the first node comprising a channel-agile mobile terminal within the wireless ad-hoc network.

41. The method of claim 23, wherein the communication network comprises a wireless infrastructure network, the first node comprising either a mobile station or a base station within the wireless infrastructure network.

42. The method claim 23, further comprising:
   determining one or more channels available to be scanned for purposes of forming or reforming a network; and
   ordering the available channels for purposes of, if the available channel is determined to be usable, spontaneously transmitting one or more probe messages to one or more other nodes on the available channel.

43. The method of claim 42, further comprising, if the first node currently has a home channel, scanning one or more of the available channels other than the current home channel of the first node in response to the first node determining that its current home channel is invalid.

44. The method of claim 43, further comprising, if the first node fails to locate another node on an available channel while scanning the one or more available channels in response to the first node determining that its current home channel is invalid, setting a next in-sequence channel that is determined to be usable as the next home channel of the first node.

45. Software associated with a first node among a plurality of distributed nodes, the first node capable of forming or reforming a communication network between the plurality of distributed nodes, each of the plurality of distributed nodes comprising functionally similar components for forming or reforming such a network, the software being embodied in computer-readable media and when executed by a computer operable to:
   store values for one or more node variables for the first node;
   spontaneously and independent of a centralized controller associated with the network, transmit a probe message to one or more other nodes in the plurality of distributed nodes for purposes of forming or reforming a network;
   receive a probe message from a second node, the probe message comprising values for one or more node variables for the second node;
   compare the values for the one or more node variables for the first node to the values for the one or more node variables for the second node within the probe message to determine, independent of a centralized controller associated with the network, whether the first node should set itself to a new channel; and
   if it is determined that the first node should set itself to the new channel, set the first node to the new channel
   wherein the one or more node variables for a node comprise:
      a home channel variable identifying whether the node currently has a home channel on which the node has data-plane connectivity with other nodes within a node group of the node and, if so, identifying the home channel of the node; and
      a switch count variable reflecting a number of times that the node has changed home channels.

46. The software of claim 45, further operable to set the value for the switch count variable for the first node to zero if the first node does not currently have a home channel.

47. The software of claim 45, further operable to, if the first node currently has a home channel and the second node does not currently have a home channel, communicate a probe message to the second node in response to the probe message received from the second node to prompt the second node to switch to the current home channel of the first node.

48. The software of claim 45, further operable to, if the first node currently has a home channel, if the second node currently has a home channel, and if the value for the switch count variable for the first node is greater than the value for the switch count variable for the second node, communicate a probe message to the second node in response to the probe message received from the second node, the second node processing the probe message communicated to the second node to determine whether the second node should set itself to the current home channel of the first node.

49. The software of claim 45, further operable to, whether or not the first node currently has a home channel, if the second node currently has a home channel and the value for the switch count variable for the first node is less than the value for the switch count variable for the second node:

set the first node to the home channel of the second node; and set the value for the switch count variable for the first node to the value for the switch count variable for the second node.

50. The software of claim 45, further operable to, if the first node currently has a home channel, if the second node has a home channel, if the value for the switch count variable for the first node is equal to the value for the switch count variable for the second node, and if the value for the home channel variable for the first node is different than the value for the home channel variable for the second node:

set the first node to the home channel of the second node; and increment the value for the switch count variable for the first node.

51. The software of claim 45, further operable to, if the first node does not currently have a home channel, if the second node currently has a home channel, and if the value for the switch count variable for the first node is greater than or equal to the value for the switch count variable for the second node:

set the first node to the home channel of the second node; and increment the value for the switch count variable for the first node.

52. The software of claim 45, further operable to discard the probe message if one or more of the following conditions is true:

a switch count difference determined after receipt of the probe message is greater than a predetermined switch count difference threshold, the switch count difference being a difference between the value for the switch count variable for the first node and the value for the switch count variable for the second node;

the first node does not currently have a home channel and the second node does not currently have a home channel; and the value for the switch count variable for the first node is equal to the value for the switch count variable for the second node and the value for the home channel variable for the first node is equal to the value for the home channel variable for the second node.

53. The software of claim 45, wherein:

the one or more node variables further comprise a rank variable; and the software is further operable to compare a value for the rank variable for the first node to a value for the rank variable for the second node if the value for the switch count variable for the first node matches the value for the switch count variable for the second node, this comparison being used to determine whether the first node should set itself to the new channel.

54. The software of claim 53, further operable to randomize the rank variable upon the occurrence of one or more conditions.

55. The software of claim 45, further operable to, if it is determined that the first node should not set itself to the new channel, discard the probe message received from the second node.

56. The software of claim 45, wherein if the first node currently has a home channel and it is determined that the first node should not set itself to the new channel, then the first node remains on its home channel.

57. The software of claim 45, further operable to, if the first node currently has a home channel and it is determined that the first node should not set itself to a new channel, communicate a probe message to the second node.

58. The software of claim 45, further operable to, if the first node does not currently have a home channel on which the first node has data-plane connectivity with one or more other nodes within a node group of the first node, spontaneously transmit, independent of receiving the probe message from the second node, one or more probe messages to one or more other nodes in the plurality of distributed nodes for purposes of determining an initial channel on which to form a network.

59. The software of claim 45, further operable to, if the first node currently has a home channel on which the first node has data-plane connectivity with other nodes within a node group of the first node, communicate a notification to the other nodes within the node group on the current home channel of the first node if it is determined that the first node should set itself to the new channel, the notification indicating to the other nodes that the first node is setting itself to the new channel.

60. The software of claim 45, wherein:

a home channel of a node comprises a channel that provides data-plane connectivity between the node and one or more other nodes within a node group of the node;

a visited channel of a node comprises a channel that provides temporary control-plane connectivity between the node and one or more other nodes for purposes of transmitting or receiving one or more probe messages to the other nodes, and one of the following is true:

the first node currently has a home channel that is a current visited channel of the second node;

the first node currently has a home channel that is a current home channel of the second node;

the first node currently has a visited channel that is a current home channel of the second node; and the first node currently has a visited channel that is a current visited channel of the second node.

61. The software of claim 45, further operable to, if the first node currently has a home channel, spontaneously transmit, independent of receiving the probe message from the second node, one or more probe messages to one or more other nodes in the plurality of distributed nodes in one or more of the following situations:

the one or more other nodes to which the one or more probe messages are spontaneously transmitted are not on the home channel of the first node, the one or more probe messages being spontaneously transmitted for purposes of:

determining whether the first node should change its current home channel; or scanning channels other than the current home channel of the first node for other nodes to which to transmit probe messages; and the one or more other nodes to which the one or more probe messages are spontaneously transmitted currently have the same home channel as the first node, the one or more probe messages being spontaneously transmitted for purposes of transmitting a beacon on the current home channel of the first node.

62. The software of claim 45, wherein the communications network comprises a wireless ad-hoc network, the first node comprising a channel-agile mobile terminal within the wireless ad-hoc network.

63. The software of claim 45, wherein the communication network comprises a wireless infrastructure network, the first node comprising either a mobile station or a base station within the wireless infrastructure network.

64. The software of claim 45, further operable to:
  determine one or more channels available to be scanned for purposes of forming or reforming a network; and
  order the available channels for purposes of, if the available channel is determined to be usable, spontaneously transmitting one or more probe messages to one or more other nodes on the available channel.

65. The software of claim 64, further operable to, if the first node currently has a home channel, scan one or more of the available channels other than the current home channel of the first node in response to the first node determining that its current home channel is invalid.

66. The software of claim 65, further operable to, if the first node fails to locate another node on an available channel while scanning the one or more available channels in response to the first node determining that its current home channel is invalid, set a next in-sequence channel that is determined to be usable as the next home channel of the first node.

67. A first node among a plurality of distributed nodes capable of forming or reforming a communication network between the plurality of distributed nodes, each of the plurality of distributed nodes comprising functionally similar components for forming or reforming such a network, the first node comprising:
  means for storing values for one or more node variables for the first node;
  means for, spontaneously and independent of a centralized controller associated with the network, transmitting a probe message to one or more other nodes in the plurality of distributed nodes for purposes of forming or reforming a network;
  means for receiving a probe message from a second node, the probe message comprising values for one or more node variables for the second node;
  means for comparing the values for the one or more node variables for the first node to the values for the one or more node variables for the second node within the probe message to determine, independent of a centralized controller associated with the network, whether the first node should set itself to a new channel; and
  means for, if it is determined that the first node should set itself to the new channel, setting the first node to the new channel
  wherein the one or more node variables for a node comprise:
    a home channel variable identifying whether the node currently has a home channel on which the node has data-plane connectivity with other nodes within a node group of the node and, if so, identifying the home channel of the node; and
    a switch count variable reflecting a number of times that the node has changed home channels.

68. A first node among a plurality of distributed nodes capable of forming or reforming a communication network between the plurality of distributed nodes, each of the plurality of distributed nodes comprising functionally similar components for forming or reforming such a network, the first node comprising:
  a memory for storing values for node variables for the first node, the node variables for the first node comprising:
    a home channel variable identifying whether the first node currently has a home channel on which the first node has data-plane connectivity with other nodes within a node group of the first node and, if so, identifying the home channel of the first node; and
    a switch count variable reflecting a number of times that the first node has changed home channels, the first node operable to set the value for the switch count variable for the first node to zero if the first node does not currently have a home channel; and
  one or more components collectively operable to:
    spontaneously and independent of a centralized controller associated with the network, transmit a probe message to one or more other nodes in the plurality of distributed nodes for purposes of forming or reforming a network;
    receive a probe message from a second node on a channel that provides temporary control-plane connectivity between the first and second nodes for communication of the probe message, the probe message comprising values for node variables for the second node;
    compare the values for the node variables for the first node to the values for the node variables for the second node within the probe message to determine, independent of a centralized controller associated with the network, whether the first node should set itself to a new channel;
    whether or not the first node currently has a home channel, if the second node currently has a home channel and the value for the switch count variable for the first node is less than the value for the switch count variable for the second node:
      set the first node to the home channel of the second node; and
      set the value for the switch count variable for the first node to the value for the switch count variable for the second node;
    if the first node currently has a home channel and the second node does not currently have a home channel, communicate a probe message to the second node in response to the probe message received from the second node to prompt the second node to switch to the current home channel of the first node;
    if the first node currently has a home channel, if the second node currently has a home channel, and if the value for the switch count variable for the first node is greater than the value for the switch count variable for the second node, communicate a probe message to the second node in response to the probe message received from the second node, the second node processing the probe message communicated to the second node to determine whether the second node should set itself to the current home channel of the first node;
    if the first node currently has a home channel, if the second node currently has a home channel, if the value for the switch count variable of the first node is equal to the value for the switch count variable for the second node, and if the value for the home channel variable for the first node is different than the value for the home channel variable for the second node:
      set the first node to the home channel of the second node; and
      increment the value for the switch count variable for the first node; and
    if the first node does not currently have a home channel, if the second node currently has a home channel, and if the value for the switch count variable for the first node is greater than or equal to the value for the switch count variable for the second node:
      set the first node to the home channel of the second node; and
      increment the value for the switch count variable for the first node.

* * * * *

UNITED STATES PATENT AND TRADEMARK OFFICE
CERTIFICATE OF CORRECTION

PATENT NO. : 7,414,982 B2  Page 1 of 1
APPLICATION NO. : 10/603240
DATED : August 19, 2008
INVENTOR(S) : Stephen P. Hershey et al.

It is certified that error appears in the above-identified patent and that said Letters Patent is hereby corrected as shown below:

Column 13, Line 9:
After "As illustrated in FIG." delete "1D" and insert -- 11D --.

Signed and Sealed this

Thirtieth Day of December, 2008

JON W. DUDAS
*Director of the United States Patent and Trademark Office*